(12) United States Patent
Jung et al.

(10) Patent No.: US 7,899,392 B2
(45) Date of Patent: Mar. 1, 2011

(54) RELAY SYSTEM AND METHOD IN A COMMUNICATION SYSTEM

(75) Inventors: Young-Ho Jung, Suwon-si (KR); Yung-Soo Kim, Seongnam-si (KR); In-Soo Hwang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 688 days.

(21) Appl. No.: 11/850,221

(22) Filed: Sep. 5, 2007

(65) Prior Publication Data

US 2008/0057864 A1 Mar. 6, 2008

(30) Foreign Application Priority Data

Sep. 6, 2006 (KR) .................. 10-2006-0085752

(51) Int. Cl.
H04B 7/14 (2006.01)
H04B 7/185 (2006.01)
H04B 7/165 (2006.01)
H04B 7/216 (2006.01)
H04B 7/212 (2006.01)
H04B 3/36 (2006.01)
H04B 7/15 (2006.01)
H04J 1/10 (2006.01)
H04J 3/08 (2006.01)
H04J 3/00 (2006.01)
H04L 5/04 (2006.01)
H04W 4/00 (2009.01)

(52) U.S. Cl. ............... 455/7; 455/11.1; 455/13.1; 455/25; 455/8; 455/9; 455/10; 455/14; 455/23; 370/315; 370/345; 370/211; 370/328; 370/338; 370/335; 370/336; 370/337

(58) Field of Classification Search ............... 455/7–25; 370/315, 345, 211, 328–338
See application file for complete search history.

(56) References Cited

U.S. PATENT DOCUMENTS

| 5,903,549 | A | * | 5/1999 | von der Embse et al. ..... 370/310 |
| 6,125,109 | A | * | 9/2000 | Fuerter ....................... 370/315 |
| 7,725,074 | B2 | * | 5/2010 | Nishio et al. .................... 455/7 |
| 2003/0125067 | A1 | * | 7/2003 | Takeda et al. ................ 455/522 |
| 2003/0190889 | A1 | * | 10/2003 | Nguyen et al. ............. 455/12.1 |
| 2004/0266339 | A1 | * | 12/2004 | Larsson .......................... 455/7 |
| 2010/0094631 | A1 | * | 4/2010 | Engdegard et al. .......... 704/258 |
| 2010/0157826 | A1 | * | 6/2010 | Yu et al. ...................... 370/252 |
| 2010/0172284 | A1 | * | 7/2010 | Horiuchi et al. ............. 370/315 |

FOREIGN PATENT DOCUMENTS

KR   10-2006-0031894 A   4/2006

* cited by examiner

Primary Examiner—Matthew D Anderson
Assistant Examiner—Bobbak Safaipour
(74) Attorney, Agent, or Firm—Jefferson IP Law, LLP (57) ABSTRACT

A relaying method and system in a communication system having a Base Station (BS), a Mobile Station (MS) for communicating with the BS, and a Relay Station (RS) for relaying signals between the BS and the MS are provided. In the relaying method and system, the BS generates a BS pilot sequence and transmits the generated BS pilot sequence to the RS, wherein a partial cross correlation between the BS pilot sequence and an RS pilot sequence, being the BS pilot sequence relayed by the RS is always '0'. Accordingly, system capacity is more efficiently utilized.

23 Claims, 4 Drawing Sheets

FIG.1

| TIME | T1 | T2 |
|------|----|----|
| BS | SEND'×1' | NO Tx |
| RS | NO Tx | RELAY'×1' |

| TIME | T1 | T2 |
|------|------|------|
| BS | SEND 'x1' | SEND 'x2' |
| RS | RELAY 'x0' | RELAY 'x1' |

RELAY SYSTEM AND METHOD IN A COMMUNICATION SYSTEM

PRIORITY

This application claims priority under 35 U.S.C. §119(a) to a Korean Patent Application filed in the Korean Intellectual Property Office on Sep. 6, 2006 and assigned Serial No. 2006-85752, the entire disclosure of which is incorporated herein by reference.

BACKGROUND OF THE INVENTION

1. Field of the Invention

The present invention generally relates to a relay communication system. More particularly, the present invention relates to a relay system and method for providing a pilot sequence that optimizes channel estimation performance in a relay communication system.

2. Description of the Related Art

Signal transmission and reception typically take place via a direction link between a Base Station (BS) and a Mobile Station (MS) in a communication system. Relative to the fixedness of BSs, however, a wireless network is not flexibly configured, shadowing area exists, and provisioning of an efficient communication service is difficult in a radio environment experiencing fluctuating change in channel status. To overcome these shortcomings, the use of Relay Stations (RSs) was proposed.

These relay communication systems increase system capacity and expand cell coverage. When the channel status between a BS and an MS is poor, an RS is positioned between them to thereby providing a better radio channel to the MS via an RS-based relay link. Signal relaying enables an MS at a cell boundary having a poor channel status to use a higher-rate data channel and expands cell coverage. The configuration of a conventional relay communication system will be described with reference to FIG. 1.

Figure 1:
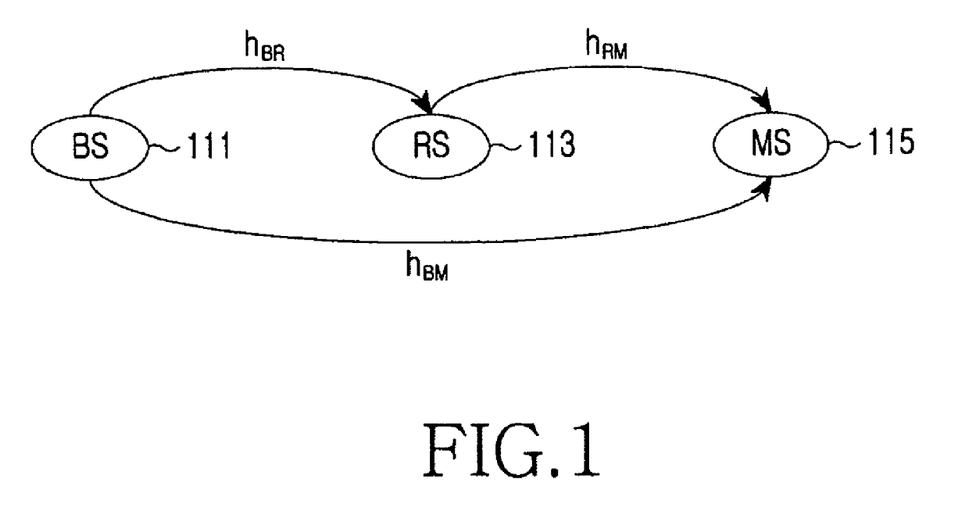
FIG. 1 illustrates the configuration of a conventional relay communication system.

FIG. 1 illustrates the configuration of a conventional relay communication system.

Referring to FIG. 1, the relay communication system includes, for example, a BS 111, an RS 113 and an MS 115. The RS 113 provides a relay path between the BS 111 and the MS 115.

Although the MS 115 and the BS 111 can communicate directly with each other, it is assumed herein that the MS 115 communicates with the BS 111 with the aid of the RS 113. The RS 113 relays signals between the BS 111 and the MS 115, and the MS 115 exchanges signals with the BS 111 via the RS 113.

Let a channel between the BS 111 and the RS 113 be denoted by $h_{BR}$, a channel between the RS 113 and the MS 115 be denoted by $h_{RM}$, and a channel between the BS 111 and the MS 115 be denoted by $h_{BM}$. If the BS 111 transmits a signal $x_B$, a signal received at the RS 113 and a signal to be forwarded by the RS 113 are given as Equation (1);

$$y_R = h_{BR}x_B + n_R$$
$$x_R = \alpha(h_{BR}x_B + n_R) \quad (1)$$

where $y_R$ denotes the signal received at the RS 113 from the BS 111, $x_R$ denotes the signal forwarded by the RS 113, $n_R$ denotes noise received at the RS 113, and $\alpha$ denotes an amplifier gain constant of the RS 113.

Meanwhile, the MS 115 receives the signal from the BS 111 via the RS 113. The received signal is expressed as Equation (2);

$$y_M = \alpha h_{RM} h_{BR} x_B + \alpha n_R + n_M \quad (2)$$

where $y_M$ denotes the signal received at the MS 115 from the BS 111 via the RS 113 and $n_M$ denotes noise received at the MS 115.

Figure 2:
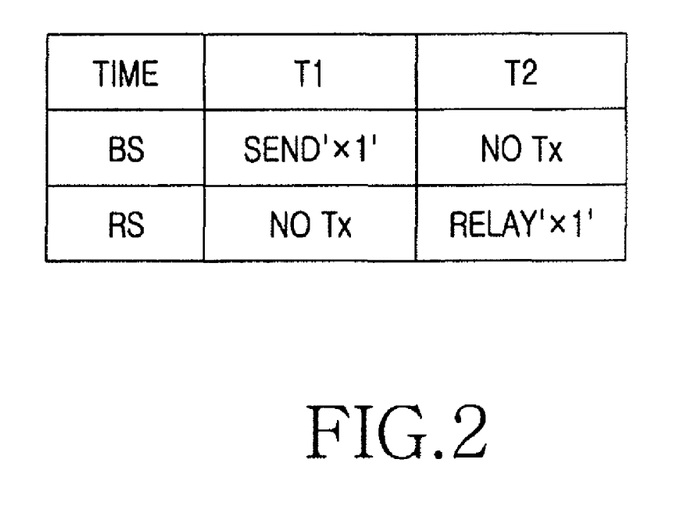
FIG. 2 illustrates a conventional half duplex relay scheme.

The communication system uses a half duplex relay scheme. For one time period, one transmitter, for example, the BS 111 or the RS 113 transmits a signal. With reference to FIG. 2, the half duplex relay scheme will be described below.

FIG. 2 illustrates a conventional half duplex relay scheme.

Referring to FIG. 2, an RS relays a signal received from a BS to an MS in a relay communication system. Two time periods, T1 and T2 are defined for signal transmission/reception.

At T1, the BS transmits a signal 'x1', and the RS receives the signal 'x1' without any signal transmission. At T2, the BS discontinues signal transmission, while the RS amplifies and forwards the received signal 'x1' to the MS. The half duplex relay scheme is characterized in that each transmitter, for example, the BS or the RS transmits a signal during a different time period.

In the half duplex relay communication system, only one transmitter operates during one time period. Therefore, overall system capacity is not efficiently utilized.

SUMMARY OF THE INVENTION

An aspect of the present invention is to address at least the above mentioned problems and/or disadvantages and to provide at least the advantages described below. Accordingly, an aspect the present invention is to provide a relay system and method in a communication system.

Another aspect of the present invention is to provide a full duplex relay system and method in a communication system.

A further aspect of the present invention is to provide a full duplex relay system and method for enabling at least two transmitters to transmit signals during one time period in a communication system using an RS that amplifies a signal for relaying.

Still another aspect of the present invention is to provide a relay system and method for generating a pilot sequence that enables a full duplex relay in a communication system using relay station adapted to a Decode-and-Forward (DF) strategy.

In accordance with an aspect of the present invention, a relaying method in a communication system having a BS, a MS for communicating with the BS, and an RS for relaying signals between the BS and the MS is provided. In the relaying method, the BS generates a BS pilot sequence and transmits the generated BS pilot sequence to the RS wherein a partial cross correlation between the BS pilot sequence and an RS pilot sequence being the BS pilot sequence relayed by the RS is always '0'.

In accordance with another aspect of the present invention, a relay system in a communication system having a BS, a MS for communicating with the BS, and an RS for relaying signals between the BS and the MS is provided. In the relay system, the BS generates a BS pilot sequence and transmits the generated BS pilot sequence to the RS, and the RS receives the BS pilot sequence from the BS and relays the received BS pilot sequence as an RS pilot sequence to the MS. Here, a partial cross correlation between the BS pilot sequence and the RS pilot sequence is always '0'.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a system and method for transmitting signals using a full duplex relay scheme, for example, in a communication system.

The communication system includes a BS, a MS for communicating with the BS, and an RS for relaying signals between the BS and the at least one MS. The BS generates a pilot sequence and transmits a signal with the pilot sequence to the RS. Simultaneously with receiving the signal from the BS, the RS amplifies a signal received from the BS in a previous time period and transmits the amplified signal to the MS.

Notably, the pilot sequence is generated such that the product between the pilot sequence and its Hermitian is a real number multiple of a unitary matrix. In other words, the BS generates a pilot sequence such that the partial cross correlation between the pilot sequence and a delayed version of the pilot sequence forwarded by the RS is '0', and the RS relays the pilot sequence to the MS. Thus, a full duplex relaying is performed. The partial cross correlation is multiplication of pilot sequences with each other.

Figure 3:
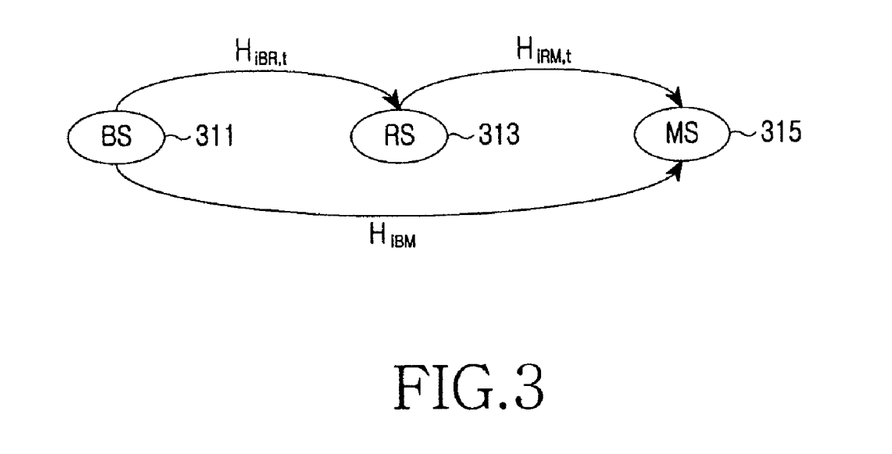
FIG. 3 illustrates the configuration of a relay communication system according to the present invention.

FIG. 3 illustrates the configuration of a relay communication system according to the present invention.

Referring to FIG. 3, the relay communication system includes a BS 311, an RS 313 and an MS 315.

To increase data rate and expand service coverage, the RS 313 provides a relay path between the BS 311 and the MS 315. The RS 313 can be a fixed RS, a mobile RS, or a general MS.

It is assumed that the communication system operates in Orthogonal Frequency Division Multiplexing (OFDM)/Orthogonal Frequency Division Multiple Access (OFDMA). The RS 313 relays signals between the BS 311 and the MS 315. Thus, the MS 315 can transmit and receive signals to and from the BS 311 via the RS 313.

Assuming that an $i^{th}$ subcarrier is a pilot subcarrier in the OFDMA system, let a channel between the BS 311 and the RS 313 on the $i^{th}$ subcarrier in a $t^{th}$ symbol interval be denoted by $H_{i,br,t}$, a channel between the RS 313 and the MS 315 on the $i^{th}$ subcarrier in the $t^{th}$ symbol interval be denoted by $H_{i,RM,t}$, and a channel between the BS 311 and the MS 315 on the $i^{th}$ subcarrier in the $t^{th}$ symbol interval be denoted by $H_{i,BM,t}$.

The relay communication system adopts a full duplex relay scheme in which at least two transmitters, for example, the BS 311 and the RS 313 transmit signals simultaneously during a given time period.

Figure 4:
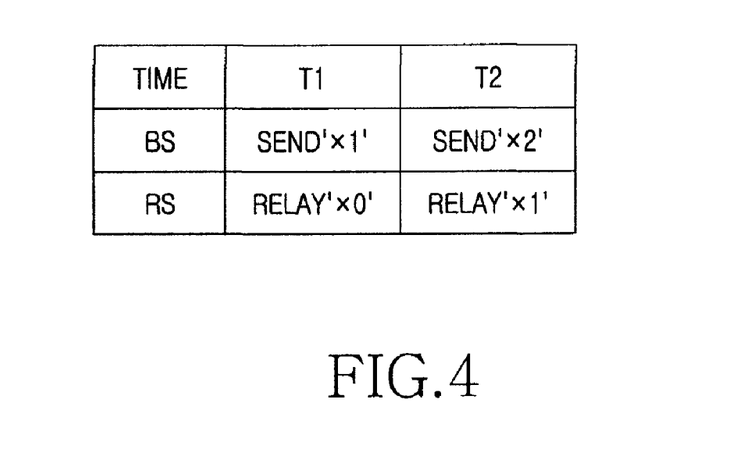
FIG. 4 illustrates a full duplex relay system according to the present invention.

With reference to FIG. 4, the full duplex relay scheme according to an exemplary embodiment of the present invention will be described.

FIG. 4 illustrates a full duplex relay scheme according to the present invention.

Referring to FIG. 4, an RS relays a signal received from a BS to an MS in a relay communication system. Two signal transmission/reception time periods T1 and T2 are identified.

At T1, the BS transmits a signal 'x1' and at the same time, the RS amplifies and transmits a previously received signal 'x0' to the MS. At T2, the BS transmits a signal 'x2' and at the same time, the RS amplifies and forwards the previously received signal 'x1' to the MS.

Compared to the conventional half duplex relay scheme, the full duplex relay scheme leads to efficient utilization of system capacity. In the full duplex relay scheme, during a given time period, one or more transmitters transmit signals, which interfere with each other. Accordingly, exemplary embodiments of the present invention propose a pilot sequence that optimizes channel estimation performance when the full duplex relay scheme is used.

Figure 5:
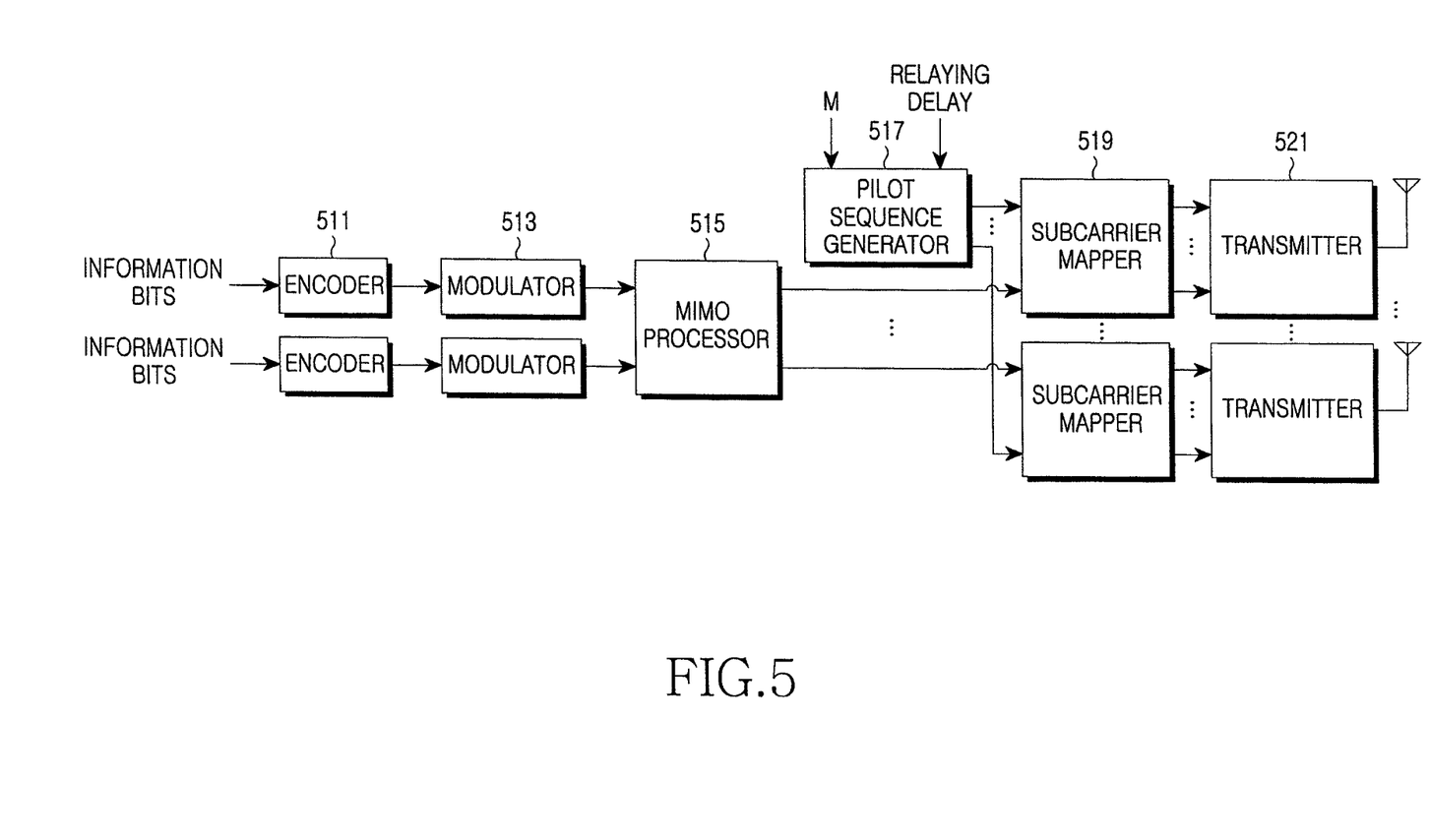
FIG. 5 is a block diagram of a BS according to the present invention.

With reference to FIG. 5, the configuration of an exemplary BS apparatus for generating and transmitting a pilot sequence will be described.

FIG. 5 is a block diagram of a BS according to the present invention.

Referring to FIG. 5, the BS includes encoders 511, modulators 513, a Multiple Input Multiple output (MIMO) processor 515, a pilot sequence generator 517, subcarrier mappers 519 and transmitters 521.

The encoders 511 encode received information bits. The modulators 513 modulate the code symbols received from the encoders 511. The MIMO processor 515 MIMO-processes the modulated signals so that they can be transmitted through multiple antennas.

If the BS transmits signals using a single antenna system, for instance, a Single Input Single Output (SISO) scheme, the MIMO processor 515 is not used, and a single subcarrier mapper 519 and a single transmitter 521 exist, which are connected to a single antenna.

The pilot sequence generator 517 generates pilot sequences according to information about the number M of antennas in current use in the BS and a relaying delay. M can be preset in the BS and information about the relaying delay is received from the RS or the MS. The pilot sequence generation will be detailed later.

The subcarrier mappers 519 map the outputs of the MIMO processor 515 and the pilot sequences received from the pilot sequence generator 517 to subcarriers.

The transmitters 521 process the outputs of the subcarrier mappers 519 by Inverse Fast Fourier Transform (IFFT), Cyclic prefix/Postfix (CP) insertion, windowing, and RF upconversion and transmit the resulting RF signals through the antennas.

The product of a pilot sequence generated in the pilot sequence generator 517 and its Hermitian sequence is a real number multiple of a unitary matrix. This pilot sequence generation condition is given as Equation (3);

$$P_t^H P_t = \lambda I \tag{3}$$

where $P_t$ is a pilot sequence matrix having a pilot sequence transmitted from a t−(2×M+1)$^{th}$ symbol interval to a t$^{th}$ symbol interval and its delayed version as column vectors. Here, M is the number of transmit antennas. H denotes a Hermitian operation, I denotes the unitary matrix, and λ denotes a real number multiplied by the unitary matrix. How $P_t$ is formed under different transmit antenna situations will be described later.

In an exemplary embodiment of the present invention, an optimal pilot sequence is acquired on the assumption that a channel is kept unchanged during 2×M symbol intervals.

Figure 6:
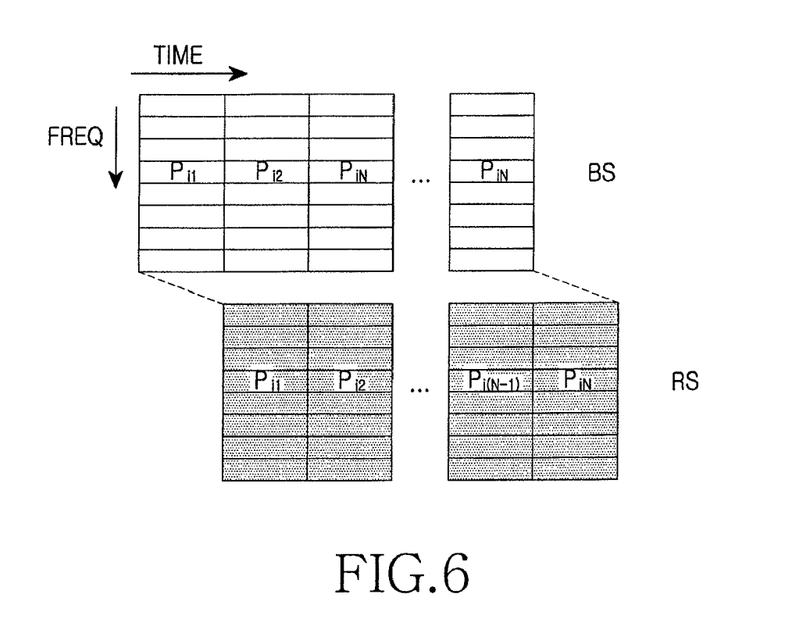
FIG. 6 is a diagram illustrating transmission time periods of pilot sequences according to the present invention.

FIG. 6 is a diagram illustrating transmission time periods of pilot sequences in a communication system according to the present invention.

Referring to FIG. 6, pilot sequences transmitted by the BS and the RS are shown. One symbol of pilot sequence transmission delay occurs between the BS and the RS. The BS and the RS each transmit a pilot sequence $P_t$ with pilot symbols $P_{i1}$ to $P_{iN}$ in symbol intervals. Let a pilot symbol of the pilot sequence $P_t$ transmitted on an i$^{th}$ subcarrier at time t be denoted by $P_{it}$.

A pilot sequence transmitted by the BS and a relayed version of the pilot sequence transmitted by the RS have a time offset of one symbol between them.

The RS receives a signal from the BS and relays the received signal with a delay of one symbol. Thus, the RS transmits a pilot symbol $P_{it-1}$ in a t$^{th}$ symbol interval.

In the case where the BS operates using a single antenna, for example, in SISO, a pilot sequence that the BS generates for a full duplex relay satisfies Equation (3). Here, $P_t$ takes the form of a matrix $$\begin{bmatrix} P_{i,t-1} & P_{i,t-2} \\ P_{i,t} & P_{i,t-1} \end{bmatrix}.$$

In SISO, received signals at the MS are modeled as Equation (4);

where $Y_{i,t}$ denotes a received signal on the i$^{th}$ subcarrier at time t, $H_{iBM,t}$, $H_{iBR,t}$ and $H_{iRM,t}$ denote the channel between the BS and the MS, the channel between the BS and the RS, and the channel between the RS and the MS on the i$^{th}$ subcarrier at time t, $P_{i,t}$ denotes a pilot symbol transmitted on the i$^{th}$ subcarrier at time t, α denotes an amplifier gain constant of the RS, and $W_{i,t}$ denotes noise received on the i$^{th}$ subcarrier at time t.

Any two of the received signals can be expressed as Equation (5);

$$\begin{bmatrix} Y_{i,t-1} \\ Y_{i,t} \end{bmatrix} = \begin{bmatrix} P_{t-1} & P_{t-2} \\ P_t & P_{t-1} \end{bmatrix} \begin{bmatrix} H_{iBM,t} \\ \alpha H_{iBR,t} H_{iRM,t} \end{bmatrix} + \begin{bmatrix} W_{i,t-1} \\ W_{i,t} \end{bmatrix} \tag{5}$$

$$H_{iBRM,t} \equiv \alpha H_{iBR,t}^{=P_t} H_{iRM,t}$$

The pilot sequence $P_t$ can be expressed as a pilot matrix of the received signals, that is, $$\begin{bmatrix} P_{i,t-1} & P_{i,t-2} \\ P_{i,t} & P_{i,t-1} \end{bmatrix}.$$

When receiving the signals from the BS, the MS performs channel estimation using $P_t$. If the MS uses a Minimum Mean Square Error (MMSE) channel estimator, the channel estimation is given as Equation (6);

$$\begin{bmatrix} \hat{H}_{iBM,t} \\ \hat{H}_{iBRM,t} \end{bmatrix} = (P_t^H P_t + I)^{-1} P_t^H \begin{bmatrix} Y_{t-1} \\ Y_t \end{bmatrix} \tag{6}$$

If the MS uses a Zero Forcing (ZF) channel estimator, the channel estimation is given as Equation (7);

$$\begin{bmatrix} \hat{H}_{iBM,t} \\ \hat{H}_{iBRM,t} \end{bmatrix} = (P_t^H P_t)^{-1} P_t^H \begin{bmatrix} Y_{t-1} \\ Y_t \end{bmatrix} \tag{7}$$

The use of the pilot sequence $P_t$ satisfying Equation (3) in the BS and the RS minimizes channel estimation errors. When the BS and the RS transmit signals in SISO according to Equation (3), their pilot sequences satisfy the following Equation (8).

$$P_{i,t-1}^* P_{i,t-2} + P_{i,t}^* P_{i,t-1} = 0 \tag{8}$$

$$|P_{i,t}|^2 + |P_{i,t-1}|^2 = |P_{i,t-1}|^2 + |P_{i,t-2}|^2$$

where $P_{i,t-1}$ and $P_{i,t}$ denote a pilot sequence from the BS and $P_{i,t-2}$ and $P_{i,t-1}$ denote a pilot sequence from the RS.

$$\begin{bmatrix} Y_{i,1} \\ Y_{i,2} \\ Y_{i,3} \\ \vdots \\ Y_{i,N} \end{bmatrix} = \begin{bmatrix} H_{iBM,1} & 0 & 0 & 0 & 0 & 0 \\ \alpha H_{iBR,1} H_{iRM,2} & H_{iBM,2} & 0 & 0 & 0 & 0 \\ 0 & \alpha H_{iBR,2} H_{iRM,2} & H_{iBM,3} & 0 & 0 & 0 \\ \vdots & \vdots & \vdots & \ddots & \vdots & \vdots \\ 0 & 0 & 0 & 0 & \alpha H_{iBR,N-1} H_{iRM,N} & H_{iBM,N} \end{bmatrix} \begin{bmatrix} P_{i,1} \\ P_{i,2} \\ P_{i,3} \\ \vdots \\ P_{i,N} \end{bmatrix} + \begin{bmatrix} W_{i,1} \\ W_{i,2} \\ W_{i,3} \\ \vdots \\ W_{i,N} \end{bmatrix} \tag{4}$$

In SISO, the following exemplary pilot sequences are available.

$$[1\ 1\ -1\ -1\ 1\ 1\ -1\ ...] \quad (9)$$

$$[\sqrt{2}\ 0\ \sqrt{2}\ 0\ \sqrt{2}\ 0\ \sqrt{2}\ 0\ \sqrt{2}\ 0\ ...]$$

$$\frac{1}{\sqrt{2}}[1+j\ 1+j\ -1-j\ -1-j\ 1+j\ 1+j\ -1-j\ -1-j\ 1+j\ 1+j\ ...]$$

In the case where the BS operates in MIMO, pilot sequences that the BS generates for a full duplex relay also satisfy Equation (3), i.e. $P_t^H P_t = \lambda I$. How the matrix $P_t$ is configured for different numbers of transmit antennas will be described below.

Assuming that the BS and the RS each use two antennas (M=2) for signal transmission and reception, pilot sequences are generated as follows.

In MIMO, received signals at the MS are modeled as Equation (10);

$$\begin{bmatrix} Y_{i,n1} \\ Y_{i,n2} \\ Y_{i,n3} \\ \vdots \\ Y_{i,nN} \end{bmatrix} = \begin{bmatrix} H_{iBM,11n} & H_{iBM,12n} & 0 & 0 & 0 & 0 & \cdots & 0 & 0 & 0 & 0 \\ \overline{H}_{iBM,21n} & \overline{H}_{iBM,22n} & H_{iBM,21n} & H_{iBM,22n} & 0 & 0 & \cdots & 0 & 0 & 0 & 0 \\ 0 & 0 & \overline{H}_{iBRM,31n} & \overline{H}_{iBRM,32n} & H_{iBM,21n} & H_{iBM,22n} & \cdots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \cdots & \overline{H}_{iBRM,N1n} & \overline{H}_{iBRM,N2n} & H_{iBM,N1n} & H_{iBM,N2n} \end{bmatrix} \begin{bmatrix} P_{i,11} \\ P_{i,21} \\ P_{i,12} \\ P_{i,22} \\ P_{i,23} \\ \vdots \\ P_{i,1(N-1)} \\ P_{i,2(N-1)} \\ P_{i,1N} \\ P_{i,2N} \end{bmatrix} + \begin{bmatrix} W_{i,n1} \\ W_{i,n2} \\ W_{i,n3} \\ \vdots \\ W_{i,nN} \end{bmatrix} \quad (10)$$

where $H_{iBM,tmn}$ denotes the channel of an $i^{th}$ subcarrier at time t from an $m^{th}$ transmit antenna of the BS to an $n^{th}$ receive antenna of the MS, $\overline{H}_{iBRM,tmn}$ denotes the effective channel of the $i^{th}$ subcarrier transmitted at time t from the $m^{th}$ transmit antenna of the BS to the $n^{th}$ receive antenna of the MS via the RS, $P_{i,mt}$ denotes a pilot symbol transmitted on the $i^{th}$ subcarrier at time t from the $m^{th}$ transmit antenna of the BS, and $Y_{i,mt}$ denotes a signal received on the $i^{th}$ subcarrier at time t at the $n^{th}$ receive antenna of the MS.

Any four of the received signals are expressed as Equation (11)

$$\begin{bmatrix} Y_{i,n(t-3)} \\ Y_{i,n(t-2)} \\ Y_{i,n(t-1)} \\ Y_{i,nt} \end{bmatrix} = \underbrace{\begin{bmatrix} P_{i,1(t-3)} & P_{i,2(t-3)} & P_{i,1(t-4)} & P_{i,2(t-4)} \\ P_{i,1(t-2)} & P_{i,2(t-2)} & P_{i,1(t-3)} & P_{i,2(t-3)} \\ P_{i,1(t-1)} & P_{i,2(t-1)} & P_{i,1(t-2)} & P_{i,2(t-2)} \\ P_{i,1t} & P_{i,2t} & P_{i,1(t-1)} & P_{i,2(t-1)} \end{bmatrix}}_{=P_t} \begin{bmatrix} H_{iBM,t1n} \\ H_{iBM,t2n} \\ \overline{H}_{iBRM,t1n} \\ \overline{H}_{iBRM,t2n} \end{bmatrix} + \begin{bmatrix} W_{i,n(t-3)} \\ W_{i,n(t-2)} \\ W_{i,n(t-1)} \\ W_{i,nt} \end{bmatrix} \quad (11)$$

where $P_t$ can be expressed as a pilot matrix of the received signals, i.e.

$$\begin{bmatrix} P_{i,1(t-3)} & P_{i,2(t-3)} & P_{i,1(t-4)} & P_{i,2(t-4)} \\ P_{i,1(t-2)} & P_{i,2(t-2)} & P_{i,1(t-3)} & P_{i,2(t-3)} \\ P_{i,1(t-1)} & P_{i,2(t-1)} & P_{i,1(t-2)} & P_{i,2(t-2)} \\ P_{i,1t} & P_{i,2t} & P_{i,1(t-1)} & P_{i,2(t-1)} \end{bmatrix}.$$

When the MS receives the signals from the BS, it performs channel estimation using $P_t$. If the MS uses an MMSE channel estimator, the channel estimation is $$\begin{bmatrix} \hat{H}_{iBM,t1n} \\ \hat{H}_{iBM,t2n} \\ \hat{H}_{iBRM,t1n} \\ \hat{H}_{iBRM,t2n} \end{bmatrix} = (P_t^H P_t + I)^{-1} P_t^H \begin{bmatrix} Y_{i,n(t-3)} \\ Y_{i,n(t-2)} \\ Y_{i,n(t-1)} \\ Y_{i,nt} \end{bmatrix} \qquad (12)$$

The use of $P_t$ satisfying Equation (3) in the BS and the RS minimizes channel estimation errors in the MS and the RS. When the BS and the RS transmit signals in MIMO according to Equation (3), their pilot sequences satisfy the following Equation (13);

$$\sum_{l=0}^{2M-1} P^*_{i,j(t-l)} P_{i,k(t-l-1)} = 0, \text{ for } j \neq k \qquad (13)$$

$$\sum_{l=0}^{2M-1} P^*_{i,j(t-l)} P_{i,k(t-l-1)} = 0, \text{ for } j \neq k$$

$$\sum_{l=0}^{2M-1} |P_{i,j(t-l)}|^2 = \sum_{l=0}^{2M-1} |P_{i,j(t-l-1)}|^2 = \lambda, \text{ for all } i \text{ and } j$$

where, $P_{i,j(t-1)}$ is a BS sequence, $P_{i,k(t-l-1)}$ is an RS sequence, and $P_{i,j(t-1)}$ and $P_{i,k(t-1)}$ are pilot sequences from the BS.

For two antennas, the following pilot sequences are available as the pilot sequences transmitted by the BS.

$$\left.\begin{aligned} -P_{i1} &= [2 \ 0 \ 0 \ 0 \ 2 \ 0 \ 0 \ 0 \ 2 \ 0 \ 0 \ \cdots] \\ P_{i2} &= [0 \ 0 \ 2 \ 0 \ 0 \ 0 \ 2 \ 0 \ 0 \ 0 \ 2 \ 0 \ \cdots] \end{aligned}\right\} 2 \text{ symbol time shift}$$

$$\left.\begin{aligned} -P_{i1} &= \begin{bmatrix} 1 & \frac{1+j}{\sqrt{2}} & -1 & \frac{1+j}{\sqrt{2}} & 1 & \frac{1+j}{\sqrt{2}} & -1 & \frac{1+j}{\sqrt{2}} & 1 & \frac{1+j}{\sqrt{2}} & -1 & \frac{1+j}{\sqrt{2}} & \cdots \end{bmatrix} \\ P_{i2} &= \begin{bmatrix} -1 & \frac{1+j}{\sqrt{2}} & 1 & \frac{1+j}{\sqrt{2}} & -1 & \frac{1+j}{\sqrt{2}} & 1 & \frac{1+j}{\sqrt{2}} & -1 & \frac{1+j}{\sqrt{2}} & 1 & \frac{1+j}{\sqrt{2}} \end{bmatrix} \\ &\underline{\text{CAZAC sequence of period 4}} \end{aligned}\right\} 2 \text{ symbol time shift}$$

As noted from Equation (14), the pilot sequences can be a Constant Amplitude and Zero Autocorrelation (CAZAC) sequence of period 4 and its two symbol-shifted sequence, or a sequence with a value every four symbols and its two symbol-shifted sequence. Here, $P_{im}$ denotes a pilot sequence vector from an $m^{th}$ transmit antenna.

For three transmit antennas in each of the BS and the RS, $P_t$ can be expressed as a pilot matrix of received signals, i.e.

$$\begin{bmatrix} P_{i,1(t-5)} & P_{1,2(t-5)} & P_{i,3(t-5)} & P_{i,1(t-6)} & P_{i,2(t-6)} & P_{i,3(t-6)} \\ P_{i,1(t-4)} & P_{i,2(t-4)} & P_{i,3(t-4)} & P_{i,1(t-5)} & P_{i,2(t-5)} & p_{i,3(t-5)} \\ P_{i,1(t-3)} & P_{i,2(t-3)} & P_{i,3(t-3)} & P_{i,1(t-4)} & P_{i,2(t-4)} & P_{i,3(t-4)} \\ P_{i,1(t-2)} & P_{i,2(t-2)} & P_{i,3(t-2)} & P_{i,1(t-3)} & P_{i,2(t-3)} & P_{i,3(t-3)} \\ P_{i,1(t-1)} & P_{i,2(t-1)} & P_{i,3(t-1)} & P_{i,1(t-2)} & P_{i,2(t-2)} & P_{i,3(t-2)} \\ P_{i,1t} & P_{i,2t} & P_{i,3t} & P_{i,1(t-1)} & P_{i,2(t-1)} & P_{i,3(t-1)} \end{bmatrix}.$$

The use of $P_t$ satisfying Equation (3) in the BS and the RS minimizes channel estimation errors. The following pilot sequences are available.

$$P_{i1} = \begin{bmatrix} \sqrt{6} & 0 & 0 & 0 & 0 & 0 & \sqrt{6} & 0 & 0 & 0 & 0 & 0 & \sqrt{6} & 0 & 0 & 0 & 0 & \cdots \end{bmatrix} \qquad (15)$$

$$P_{i2} = \begin{bmatrix} 0 & 0 & \sqrt{6} & 0 & 0 & 0 & 0 & 0 & \sqrt{6} & 0 & 0 & 0 & 0 & 0 & \sqrt{6} & 0 & 0 & \cdots \end{bmatrix} \text{2 symbol time shift}$$

$$P_{i3} = \begin{bmatrix} 0 & 0 & 0 & 0 & \sqrt{6} & 0 & 0 & 0 & 0 & 0 & \sqrt{6} & 0 & 0 & 0 & 0 & 0 & \sqrt{6} & 0 & \cdots \end{bmatrix} \text{2 symbol time shift}$$

-continued $$P_{i1} = \begin{bmatrix} 1 & \frac{\sqrt{3}+j}{2} & \frac{-1+\sqrt{3}j}{2} & -1 & \frac{-1+\sqrt{3}j}{2} & \frac{\sqrt{3}+j}{2} & \cdots \\ & 1 & \frac{\sqrt{3}+j}{2} & \frac{-1+\sqrt{3}j}{2} & -1 & \frac{-1+\sqrt{3}j}{2} & \frac{\sqrt{3}+j}{2} & \cdots \end{bmatrix}$$

$$P_{i2} = \begin{bmatrix} \frac{-1+\sqrt{3}j}{2} & \frac{\sqrt{3}+j}{2} & 1 & \frac{\sqrt{3}+j}{2} & \frac{-1+\sqrt{3}j}{2} & -1 & \cdots \\ \frac{-1+\sqrt{3}j}{2} & \frac{\sqrt{3}+j}{2} & 1 & \frac{\sqrt{3}+j}{2} & \frac{-1+\sqrt{3}j}{2} & -1 \end{bmatrix} \text{2 symbol time shift}$$

$$P_{i3} = \begin{bmatrix} \frac{-1+\sqrt{3}j}{2} & -1 & \frac{-1+\sqrt{3}j}{2} & \frac{\sqrt{3}+j}{2} & 1 & \frac{\sqrt{3}+j}{2} \\ \overline{\text{CAZAC sequence of period 6}} & & & & & \cdots \\ \frac{-1+\sqrt{3}j}{2} & -1 & \frac{-1+\sqrt{3}j}{2} & \frac{\sqrt{3}+j}{2} & 1 & \frac{\sqrt{3}+j}{2} \end{bmatrix} \text{2 symbol time shift}$$

Referring to Equation (15), the pilot sequences of the BS and the RS each using three transmit antennas are CAZAC sequences of period 6, for example.

For four transmit antennas in each of the BS and the RS, $P_t$ can be expressed as a pilot matrix of received signals, i.e.

$$\begin{bmatrix} P_{i,1(t-7)} & P_{i,2(t-7)} & P_{i,3(t-7)} & P_{i,4(t-7)} & P_{i,1(t-8)} & P_{i,2(t-8)} & P_{i,3(t-8)} & P_{i,4(t-8)} \\ P_{i,1(t-6)} & P_{i,2(t-6)} & P_{i,3(t-6)} & P_{i,4(t-6)} & P_{i,1(t-7)} & P_{i,2(t-7)} & P_{i,3(t-7)} & P_{i,4(t-7)} \\ P_{i,1(t-5)} & P_{i,2(t-5)} & P_{i,3(t-5)} & P_{i,4(t-5)} & P_{i,1(t-6)} & P_{i,2(t-6)} & P_{i,3(t-6)} & P_{i,4(t-6)} \\ P_{i,1(t-4)} & P_{i,2(t-4)} & P_{i,3(t-4)} & P_{i,4(t-4)} & P_{i,1(t-5)} & P_{i,2(t-5)} & p_{i,3(t-5)} & P_{i,4(t-5)} \\ P_{i,1(t-3)} & P_{i,2(t-3)} & P_{i,3(t-3)} & P_{i,4(t-3)} & P_{i,1(t-4)} & P_{i,2(t-4)} & P_{i,3(t-4)} & P_{i,4(t-4)} \\ P_{i,1(t-2)} & P_{i,2(t-2)} & P_{i,3(t-2)} & P_{i,4(t-2)} & P_{i,1(t-3)} & P_{i,2(t-3)} & P_{i,3(t-3)} & P_{i,4(t-3)} \\ P_{i,1(t-1)} & P_{i,2(t-1)} & P_{i,3(t-1)} & P_{i,4(t-1)} & P_{i,1(t-2)} & P_{i,2(t-2)} & P_{i,3(t-2)} & P_{i,4(t-2)} \\ P_{i,1t} & P_{i,2t} & P_{i,3t} & P_{i,4t} & P_{i,1(t-1)} & P_{i,2(t-1)} & P_{i,3(t-1)} & P_{i,4(t-1)} \end{bmatrix}$$

The use of $P_t$ satisfying Equation (3) in the BS and the RS minimizes channel estimation errors. Examples of pilot sequences for this case are given as follows.

$$P_{i1} = \begin{bmatrix} 1 & 1 & j & -1 & 1 & -1 & j & 1 & \cdots \\ 1 & 1 & j & -1 & 1 & -1 & j & 1 \end{bmatrix}$$ (16)

$$P_{i2} = \begin{bmatrix} j & 1 & 1 & 1 & j & -1 & 1 & -1 \\ j & 1 & 1 & 1 & j & -1 & 1 & -1 \end{bmatrix} \cdots \text{2 symbol time shift}$$

$$P_{i3} = \begin{bmatrix} 1 & -1 & j & 1 & 1 & 1 & j & -1 \\ 1 & -1 & j & 1 & 1 & 1 & j & -1 \end{bmatrix} \cdots \text{2 symbol time shift}$$

$$P_{i4} = \begin{bmatrix} j & -1 & 1 & -1 & j & 1 & 1 & 1 \\ \overline{\text{CAZAC sequence of period 8}} & & & & & \cdots \\ j & -1 & 1 & -1 & j & 1 & 1 & 1 \end{bmatrix} \text{2 symbol time shift}$$

As noted from Equation (16), the pilot sequences can be CAZAC sequences of period 8.

Now a description will be made of a pilot sequence, in the case where the pilot sequence is delayed by 'a' symbol interval at the RS. Also, in this case, the BS generates a pilot sequence satisfying Equation (3).

While a pilot sequence for SISO is described below, pilot sequences for MIMO can be generated by extending the pilot sequence for SISO and thus will not be described separately. Any two signals received from the BS are expressed as Equation (17);

$$\begin{bmatrix} Y_{i,t-1} \\ Y_{i,t} \end{bmatrix} = \underbrace{\begin{bmatrix} P_{i,t-1} & P_{i,t-a-1} \\ P_{i,t} & P_{i,t-a} \end{bmatrix}}_{=P_t} \begin{bmatrix} H_{iBM,t} \\ \alpha H_{iBR,t} H_{iRM,t} \end{bmatrix} + \begin{bmatrix} W_{i,t-1} \\ W_{i,t} \end{bmatrix} \quad (17)$$

$$H_{iBRM,t} \equiv \alpha H_{iBR,t} H_{iRM,t}$$

The pilot sequence $P_t$ can be expressed as a pilot matrix of the received signals, that is, $$\begin{bmatrix} P_{i,t-1} & P_{i,t-a-1} \\ P_{i,t} & P_{i,t-a} \end{bmatrix}.$$

The use of the pilot sequence $P_t$ satisfying Equation (3) in the BS minimizes channel estimation errors. When the BS transmits a pilot sequence in SISO according to Equation (3), the pilot sequence satisfies the following Equation (18);

$$P_{t-1}^* P_{t-a-1} + P_t^* P_{t-a} = 0 \quad (18)$$

$$|P_t|^2 + |P_{t-1}|^2 = |P_{t-a-1}|^2 + |P_{t-a}|^2$$

For a=2, for example, the following examples of pilot sequences are available. The 'a' is symbol interval $$-[\sqrt{2} \quad \sqrt{2} \quad 0 \quad 0 \quad \sqrt{2} \quad \sqrt{2} \quad 0 \quad 0 \quad \sqrt{2} \quad \sqrt{2} \quad \cdots] \quad (19)$$

$$-[1 \quad 1 \quad 1 \quad -1 \quad 1 \quad 1 \quad 1 \quad -1 \quad 1 \quad 1 \quad 1 \quad -1 \cdots]$$

When multiple antennas are used, for example, in MIMO, pilot sequences are generated by the above SISO pilot sequence generation method using changed antenna indexes or time indexes.

Now a description will be made of the configuration of an exemplary RS for receiving the pilot sequence from the BS with reference to FIG. 7.

Figure 7:
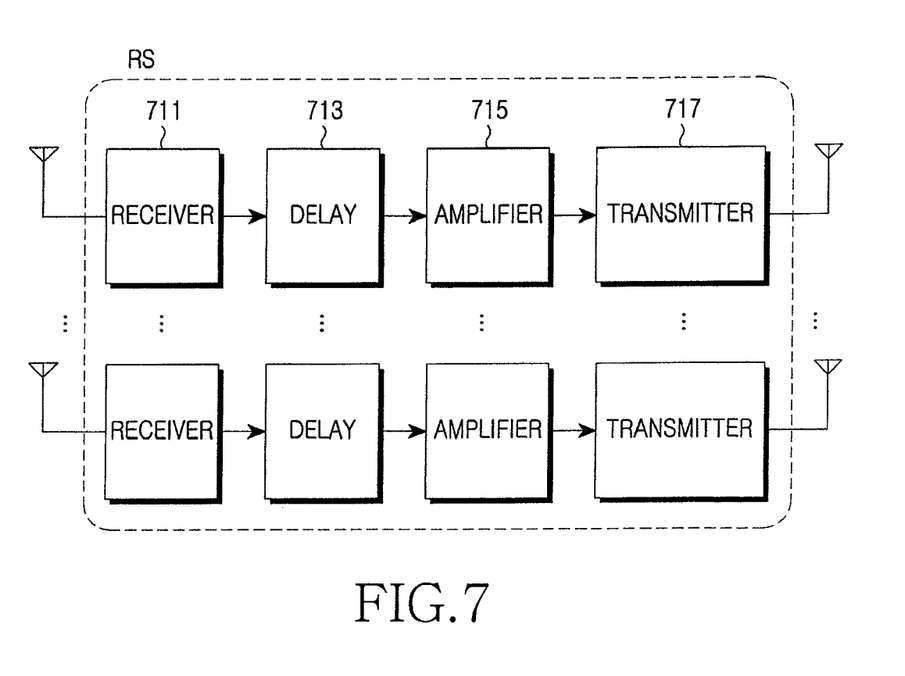
FIG. 7 is a block diagram of an RS according to the present invention.

FIG. 7 is a block diagram of an RS for performing a relay function according to the present invention.

Referring to FIG. 7, the RS includes receivers 711, delays 713, amplifiers 715 and transmitters 717.

The receivers 711 receive signals from the BS and process the received signals.

The delays 713 delay the signals received from the receivers 711 by a predetermined time period.

The amplifiers 715 amplify the delayed signals to a power level high enough for the MS to receive the signals.

The transmitters 717 process the amplified signals and transmit them to the MS.

As a transmitter, for example, the BS generates a pilot sequence and transmits a signal using the pilot sequence so as to minimize channel estimation errors in the MS. Since the RS uses the pilot sequence received from the BS, interference between signals transmitted using the pilot sequence is minimized in the relay communication system.

As is apparent from the above description, at least two transmitters can transmit signals simultaneously during one time interval in a full duplex relay scheme in a relay communication system. A pilot sequence proposed to suit the full duplex relay reduces channel estimation errors in an MS and enables full duplex relaying.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A relaying method in a communication system having a Base Station (BS), a Mobile Station (MS) for communicating with the BS, and a Relay Station (RS) for relaying signals between the BS and the MS, the method comprising:
   generating a BS pilot sequence;
   transmitting the generated BS pilot sequence to the RS; and
   transmitting a next BS signal, while the RS transmits a previous BS signal received from the BS as an RS signal,
   wherein a value of a partial cross correlation between the generated BS pilot sequence and an RS pilot sequence is always '0', and the RS pilot sequence is the generated BS pilot sequence relayed by the RS.

2. The relaying method of claim 1, wherein a time offset between the generated BS pilot sequence and the RS pilot sequence is one symbol.

3. The relaying method of claim 2, wherein if the BS and the RS operate in a Single Input Single Output (SISO) scheme, the generated BS pilot sequence and the RS pilot sequence satisfy the following equation, $$P^*_{i,t-1}P_{i,t-2} + P^*_{i,t}P_{i,t-1} + 0$$

$$|P_{i,t}|^2 + |P_{i,t-1}|^2 = |P_{i,t-1}|^2 + |P_{i,t-2}|^2$$

where $P_{i,t}$ denotes the generated BS pilot sequence at time t, $P_{i,t-1}$ denotes the RS pilot sequence at time t−1, and $P_{i,t-2}$ denotes the RS pilot sequence at time t−2.

4. The relaying method of claim 3, wherein the generated BS pilot sequence is one of the following pilot sequences, $$[1 \quad 1 \quad -1 \quad -1 \quad 1 \quad 1 \quad -1 \quad -1 \quad 1 \quad 1 \cdots]$$

$$[\sqrt{2} \quad 0 \quad \sqrt{2} \quad 0 \quad \sqrt{2} \quad 0 \quad \sqrt{2} \quad 0 \quad \sqrt{2} \quad 0 \cdots]$$

$$\frac{1}{\sqrt{2}}[1+j \quad 1+j \quad -1-j \quad -1-j \quad 1+j \quad 1+j \quad -1-j \quad -1-j \quad 1+j \quad 1+j \cdots].$$

5. The relaying method of claim 2, wherein if the BS and the RS operate in a Multiple Input Multiple Output (MIMO) scheme for M antennas, the generated BS pilot sequence and the RS pilot sequence satisfy the following equation, $$\sum_{l=0}^{2M-1} P^*_{i,j(t-l)}P_{i,k(t-l-1)} = 0, \quad \text{for } j \neq k$$

$$\sum_{l=0}^{2M-1} P^*_{i,j(t-l)}P_{i,k(t-l)} = 0, \quad \text{for } j \neq k$$

$$\sum_{l=0}^{2M-1} |P_{i,j(t-l)}|^2 = \sum_{l=0}^{2M-1} |P_{i,j(t-l-1)}|^2 = \lambda, \quad \text{for all } i \text{ and } j$$

where $P_{i,j(t-1)}$ and $P_{i,k(t-1)}$ are BS pilot sequences, and $P_{i,k(t-l-1)}$ is the RS pilot sequence.

6. The relaying method of claim 5, wherein if M is 2, the generated BS pilot sequence is one of the following pilot sequences set, $-P_{i1} = [2\ 0\ 0\ 0\ 2\ 0\ 0\ 0\ 2\ 0\ 0\ 0\ \cdots]$
$P_{i2} = [0\ 0\ 2\ 0\ 0\ 0\ 2\ 0\ 0\ 0\ 2\ 0\ \cdots]$ } 2 symbol time shift $-P_{i1} = \left[ 1\ \ \frac{1+j}{\sqrt{2}}\ \ -1\ \ \frac{1+j}{\sqrt{2}}\ \ 1\ \ \frac{1+j}{\sqrt{2}}\ \ -1\ \ \frac{1+j}{\sqrt{2}}\ \ 1\ \ \frac{1+j}{\sqrt{2}}\ \ -1\ \ \frac{1+j}{\sqrt{2}}\ \ \cdots \right]$
$P_{i2} = \left[ -1\ \ \underbrace{\frac{1+j}{\sqrt{2}}\ \ 1\ \ \frac{1+j}{\sqrt{2}}}_{\text{CAZAC sequence of period 4}}\ \ -1\ \ \frac{1+j}{\sqrt{2}}\ \ 1\ \ \frac{1+j}{\sqrt{2}}\ \ -1\ \ \frac{1+j}{\sqrt{2}}\ \ 1\ \ \frac{1+j}{\sqrt{2}}\ \ \cdots \right]$ } 2 symbol time shift.

7. The relaying method of claim 5, wherein if M is 3, the generated BS pilot sequence is one of the following pilot sequences set, $P_{i1} = [\sqrt{6}\ \ 0\ \ 0\ \ 0\ \ 0\ \ \sqrt{6}\ \ 0\ \ 0\ \ 0\ \ 0\ \ \sqrt{6}\ \ 0\ \ 0\ \ 0\ \ 0\ \ 0\ \cdots]$
$P_{i2} = [0\ \ 0\ \ \sqrt{6}\ \ 0\ \ 0\ \ 0\ \ 0\ \ \sqrt{6}\ \ 0\ \ 0\ \ 0\ \ 0\ \ \sqrt{6}\ \ 0\ \ 0\ \ 0\ \cdots]$ 2 symbol time shift
$P_{i3} = [0\ \ 0\ \ 0\ \ 0\ \ \sqrt{6}\ \ 0\ \ 0\ \ 0\ \ 0\ \ \sqrt{6}\ \ 0\ \ 0\ \ 0\ \ 0\ \ \sqrt{6}\ \ 0\ \cdots]$ 2 symbol time shift $P_{i1} = \left[ 1\ \ \frac{\sqrt{3}+j}{2}\ \ \frac{-1+\sqrt{3}j}{2}\ \ -1\ \ \frac{-1+\sqrt{3}j}{2}\ \ \frac{\sqrt{3}+j}{2}\ \ 1\ \ \frac{\sqrt{3}+j}{2}\ \ \frac{-1+\sqrt{3}j}{2}\ \ -1\ \ \frac{-1+\sqrt{3}j}{2}\ \ \frac{\sqrt{3}+j}{2}\ \ \cdots \right]$ $P_{i2} = \left[ \frac{-1+\sqrt{3}j}{2}\ \ \frac{\sqrt{3}+j}{2}\ \ 1\ \ \frac{\sqrt{3}+j}{2}\ \ \frac{-1+\sqrt{3}j}{2}\ \ -1\ \ \frac{-1+\sqrt{3}j}{2}\ \ \frac{\sqrt{3}+j}{2}\ \ 1\ \ \frac{\sqrt{3}+j}{2}\ \ \frac{-1+\sqrt{3}j}{2}\ \ -1\ \cdots \right]$ 2 symbol time shift $P_{i3} = \left[ \underbrace{\frac{-1+\sqrt{3}j}{2}\ \ -1\ \ \frac{-1+\sqrt{3}j}{2}\ \ \frac{\sqrt{3}+j}{2}}_{\text{CAZAC sequence of period 6}}\ \ 1\ \ \frac{\sqrt{3}+j}{2}\ \ \frac{-1+\sqrt{3}j}{2}\ \ -1\ \ \frac{-1+\sqrt{3}j}{2}\ \ \frac{\sqrt{3}+j}{2}\ \ 1\ \ \frac{\sqrt{3}+j}{2}\ \cdots \right]$ 2 symbol time shift.

8. The relaying method of claim 5, wherein if M is 4, the generated BS pilot sequence is one of the following pilot sequences set, $P_{i1} = [1\ \ 1\ \ j\ \ -1\ \ 1\ \ -1\ \ j\ \ 1\ \ 1\ \ 1\ \ j\ \ -1\ \ 1\ \ -1\ \ j\ \ 1\ \cdots]$
$P_{i2} = [j\ \ 1\ \ 1\ \ 1\ \ j\ \ -1\ \ 1\ \ -1\ \ j\ \ 1\ \ 1\ \ 1\ \ j\ \ -1\ \ 1\ \ -1\ \cdots]$ 2 symbol time shift
$P_{i3} = [1\ \ -1\ \ j\ \ 1\ \ 1\ \ 1\ \ j\ \ -1\ \ 1\ \ -1\ \ j\ \ 1\ \ 1\ \ 1\ \ j\ \ -1\ \cdots]$ 2 symbol time shift
$P_{i4} = \left[ \underbrace{j\ \ -1\ \ 1\ \ -1\ \ j\ \ 1\ \ 1\ \ 1}_{\text{CAZAC sequence of period 8}}\ \ j\ \ -1\ \ 1\ \ -1\ \ j\ \ 1\ \ 1\ \ 1\ \cdots \right]$ 2 symbol time shift.

9. The relaying method of claim 1, wherein a time offset between the generated BS pilot sequence and the RS pilot sequence is 'a' symbol.

10. The relaying method of claim 9, wherein if the BS and the RS operate in a Single Input Single Output (SISO) scheme, the generated BS pilot sequence and the RS pilot sequence satisfy the following equation, $P^*_{t-1} P_{t-a-1} + P^*_t P_{t-a} = 0$ $|P_t|^2 + |P_{t-1}|^2 = |P_{t-a-1}|^2 + |P_{t-a}|^2$ where $P_t$ denotes the generated BS pilot sequence at time t, $P_{t-1}$ denotes the RS pilot sequence at time t−1, $P_{t-2}$ denote the RS pilot sequence at time t−2, and 'a' denotes a symbol interval.

11. The relaying method of claim 10, wherein the generated BS pilot sequence is one of the following pilot sequences, $-[\sqrt{2}\ \ \sqrt{2}\ \ 0\ \ 0\ \ \sqrt{2}\ \ \sqrt{2}\ \ 0\ \ 0\ \ \sqrt{2}\ \ \sqrt{2}\ \ \cdots]$ $-[1\ \ 1\ \ 1\ \ -1\ \ 1\ \ 1\ \ 1\ \ -1\ \ 1\ \ 1\ \ 1\ \ -1\ \cdots]$.

12. A relay system in a communication system, comprising:
a Base Station (BS) for generating a BS pilot sequence, transmitting the generated BS pilot sequence to the RS, and transmitting a next BS signal while the RS transmits a previous BS signal received from the BS as an RS signal; and a Relay Station (RS) for receiving the generated BS pilot sequence from the BS and relaying the received BS pilot sequence as an RS pilot sequence to a Mobile Station (MS), wherein a partial cross correlation between the generated BS pilot sequence and the RS pilot sequence is always '0'.

13. The relay system of claim 12, wherein the BS comprises a pilot sequence generator for generating the BS pilot sequence using a relaying delay of the RS and information about a number of antennas.

14. The relay system of claim 12, wherein a time offset between the generated BS pilot sequence and the RS pilot sequence is one symbol.

15. The relay system of claim 14, wherein if the BS and the RS operate in a Single Input Single Output (SISO) scheme, the generated BS pilot sequence and the RS pilot sequence satisfy the following equation, $$P_{i,t-1}^* P_{i,t-2} + P_{i,t}^* P_{i,t-1} = 0$$

$$|P_{i,t}|^2 + |P_{i,t-1}|^2 = |P_{i,t-1}|^2 + |P_{i,t-2}|^2$$

where $P_{i,t}$ denotes the generated BS pilot sequence at time t, $P_{i,t-1}$ denotes the RS pilot sequence at time t−1, and $P_{i,t-2}$ denotes the RS pilot sequence at time t−2.

16. The relay system of claim 15, wherein the generated BS pilot sequence is one of the following pilot sequences, $$[1 \quad 1 \quad -1 \quad -1 \quad 1 \quad 1 \quad -1 \quad -1 \quad 1 \quad 1 \cdots]$$

$$[\sqrt{2} \quad 0 \quad \sqrt{2} \quad 0 \quad \sqrt{2} \quad 0 \quad \sqrt{2} \quad 0 \quad \sqrt{2} \quad 0 \cdots]$$

$$\frac{1}{\sqrt{2}}[1+j \quad 1+j \quad -1-j \quad -1-j \quad 1+j \quad 1+j \quad -1-j \quad -1-j \quad 1+j \quad 1+j \cdots].$$

17. The relay system of claim 14, wherein if the BS and the RS operate in a Multiple Input Multiple Output (MIMO) scheme for M antennas, the generated BS pilot sequence and the RS pilot sequence satisfy the following equation, $$\sum_{l=0}^{2M-1} P_{i,j(t-l)}^* P_{i,k(t-l-1)} = 0, \quad \text{for } j \neq k$$

$$\sum_{l=0}^{2M-1} P_{i,j(t-l)}^* P_{i,k(t-l)} = 0, \quad \text{for } j \neq k$$

$$\sum_{l=0}^{2M-1} |P_{i,j(t-l)}|^2 = \sum_{l=0}^{2M-1} |P_{i,j(t-l-1)}|^2 = \lambda, \quad \text{for all } i \text{ and } j$$

where $P_{i,j(t-1)}$ and $P_{i,k(t\ -1)}$ are BS pilot sequences, and $P_{i,k(t\ -l-1)}$ is the RS pilot sequence.

18. The relay system of claim 17, wherein if M is 2, the generated BS pilot sequence is one of the following pilot sequences set, $$\left. \begin{array}{l} -P_{i1} = [2 \quad 0 \quad 0 \quad 0 \quad 2 \quad 0 \quad 0 \quad 0 \quad 2 \quad 0 \quad 0 \cdots] \\ P_{i2} = [0 \quad 0 \quad 2 \quad 0 \quad 0 \quad 0 \quad 2 \quad 0 \quad 0 \quad 0 \quad 2 \quad 0 \cdots] \end{array} \right\} 2 \text{ symbol time shift}$$

$$\left. \begin{array}{l} -P_{i1} = \left[ 1 \quad \frac{1+j}{\sqrt{2}} \quad -1 \quad \frac{1+j}{\sqrt{2}} \quad 1 \quad \frac{1+j}{\sqrt{2}} \quad -1 \quad \frac{1+j}{\sqrt{2}} \quad 1 \quad \frac{1+j}{\sqrt{2}} \quad -1 \quad \frac{1+j}{\sqrt{2}} \cdots \right] \\ P_{i2} = \left[ -1 \quad \frac{1+j}{\sqrt{2}} \quad 1 \quad \frac{1+j}{\sqrt{2}} \quad -1 \quad \frac{1+j}{\sqrt{2}} \quad 1 \quad \frac{1+j}{\sqrt{2}} \quad -1 \quad \frac{1+j}{\sqrt{2}} \quad 1 \quad \frac{1+j}{\sqrt{2}} \cdots \right] \\ \underline{\text{CAZAC sequence of period 4}} \end{array} \right\} 2 \text{ symbol time shift.}$$

19. The relay system of claim 17, wherein if M is 3, the generated BS pilot sequence is one of the following pilot sequences set, $$P_{i1} = [\sqrt{6} \quad 0 \quad 0 \quad 0 \quad 0 \quad 0 \quad \sqrt{6} \quad 0 \quad 0 \quad 0 \quad 0 \quad 0 \quad \sqrt{6} \quad 0 \quad 0 \quad 0 \quad 0 \quad 0 \cdots]$$

$$P_{i2} = [0 \quad 0 \quad \sqrt{6} \quad 0 \quad 0 \quad 0 \quad 0 \quad 0 \quad \sqrt{6} \quad 0 \quad 0 \quad 0 \quad 0 \quad 0 \quad \sqrt{6} \quad 0 \quad 0 \quad 0 \cdots] \text{ 2 symbol time shift}$$

$$P_{i3} = [0 \quad 0 \quad 0 \quad 0 \quad 0 \quad \sqrt{6} \quad 0 \quad 0 \quad 0 \quad 0 \quad 0 \quad \sqrt{6} \quad 0 \quad 0 \quad 0 \quad 0 \quad 0 \quad \sqrt{6} \quad 0 \cdots] \text{ 2 symbol time shift}$$

$$P_{i1} = \left[ 1 \quad \frac{\sqrt{3}+j}{2} \quad \frac{-1+\sqrt{3}j}{2} \quad -1 \quad \frac{-1+\sqrt{3}j}{2} \quad \frac{\sqrt{3}+j}{2} \quad 1 \quad \frac{\sqrt{3}+j}{2} \quad \frac{-1+\sqrt{3}j}{2} \quad -1 \quad \frac{-1+\sqrt{3}j}{2} \quad \frac{\sqrt{3}+j}{2} \cdots \right]$$

$$P_{i2} = \left[ \frac{-1+\sqrt{3}j}{2} \quad \frac{\sqrt{3}+j}{2} \quad 1 \quad \frac{\sqrt{3}+j}{2} \quad \frac{-1+\sqrt{3}j}{2} \quad -1 \quad \frac{-1+\sqrt{3}j}{2} \quad \frac{\sqrt{3}+j}{2} \quad 1 \quad \frac{\sqrt{3}+j}{2} \quad \frac{-1+\sqrt{3}j}{2} \quad -1 \cdots \right] \text{ 2 symbol time shift}$$

$$P_{i3} = \left[ \underbrace{\frac{-1+\sqrt{3}j}{2} \quad -1 \quad \frac{-1+\sqrt{3}j}{2} \quad \frac{\sqrt{3}+j}{2} \quad 1 \quad \frac{\sqrt{3}+j}{2}}_{\text{CAZAC sequence of period 6}} \quad \frac{-1+\sqrt{3}j}{2} \quad -1 \quad \frac{-1+\sqrt{3}j}{2} \quad \frac{\sqrt{3}+j}{2} \quad 1 \quad \frac{\sqrt{3}+j}{2} \cdots \right] \text{ 2 symbol time shift.}$$

20. The relay system of claim 17, wherein if M is 4, the generated BS pilot sequence is one of the following pilot sequences set, $$P_{i1} = [1 \quad 1 \quad j \quad -1 \quad 1 \quad -1 \quad j \quad 1 \quad 1 \quad 1 \quad j \quad -1 \quad 1 \quad -1 \quad j \quad 1 \cdots]$$

$$P_{i2} = [j \quad 1 \quad 1 \quad 1 \quad j \quad -1 \quad 1 \quad -1 \quad j \quad 1 \quad 1 \quad 1 \quad j \quad -1 \quad 1 \quad -1 \cdots] \text{ 2 symbol time shift}$$

$$P_{i3} = [1 \quad -1 \quad j \quad 1 \quad 1 \quad 1 \quad j \quad -1 \quad 1 \quad -1 \quad j \quad 1 \quad 1 \quad 1 \quad j \quad -1 \cdots] \text{ 2 symbol time shift}$$

$$P_{i4} = \left[ \underbrace{j \quad -1 \quad 1 \quad -1 \quad j \quad 1 \quad 1 \quad 1}_{\text{CAZAC sequence of period 8}} \quad j \quad -1 \quad 1 \quad -1 \quad j \quad 1 \quad 1 \quad 1 \cdots \right] \text{ 2 symbol time shift.}$$

21. The relay system of claim 12, wherein a time offset between the generated BS pilot sequence and the RS pilot sequence is 'a' symbol.

22. The relay system of claim 21, wherein if the BS and the RS operate in a Single Input Single Output (SISO) scheme, the generated BS pilot sequence and the RS pilot sequence satisfy the following equation, $$P_{t-1}^* P_{t-a-1} + P_t^* P_{t-a} = 0$$

$$|P_t|^2 + |P_{t-1}|^2 = |P_{t-a-1}|^2 + |P_{t-a}|^2$$

where $P_t$ denotes the generated BS pilot sequence at time t, $P_{t-1}$ denotes the RS pilot sequence at time t−1, $P_{t-2}$ denotes the RS pilot sequence at time t−2, and 'a' denotes a symbol interval.

23. The relay system of claim 21, wherein the generated BS pilot sequence comprises one of the following pilot sequences, $$-[\sqrt{2} \quad \sqrt{2} \quad 0 \quad 0 \quad \sqrt{2} \quad \sqrt{2} \quad 0 \quad 0 \quad \sqrt{2} \quad \sqrt{2} \cdots]$$

$$-[1 \quad 1 \quad 1 \quad -1 \quad 1 \quad 1 \quad 1 \quad -1 \quad 1 \quad 1 \quad 1 \quad -1 \cdots].$$

* * * * *